Mar. 3, 1925.  
J. FERNANDES, JR  
TREE PROTECTOR  
Filed July 13, 1923
1,528,663
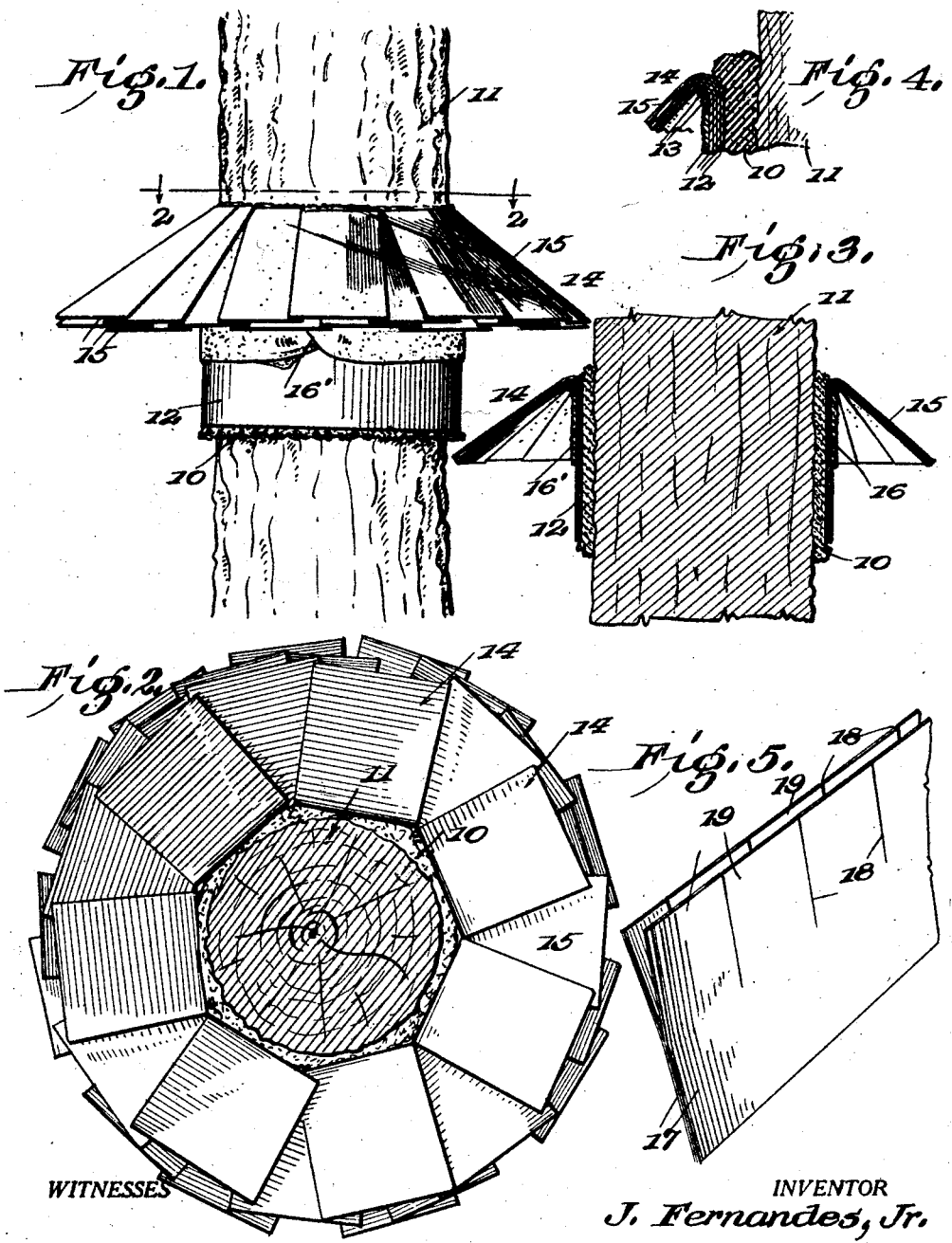
WITNESSES  
W. A. Williams
INVENTOR  
J. Fernandes, Jr.  
BY  
ATTORNEYS Patented Mar. 3, 1925.

1,528,663

UNITED STATES PATENT OFFICE.

JACINTHO FERNANDES, JR., OF NEW ORLEANS, LOUISIANA.

TREE PROTECTOR.

Application filed July 13, 1923. Serial No. 651,337.

*To all whom it may concern:*

Be it known that I, JACINTHO FERNANDES, Jr., a citizen of the United States, residing at New Orleans, in the parish of Orleans and State of Louisiana, have invented certain new and useful Improvements in Tree Protectors, of which the following is a specification.

This invention relates to an insect protector for trees.

The invention more particularly relates to a protector means whereby to prevent ants from crawling up the trunks of trees. Ants of this character principally exist in citrus fruit growing regions. The so-called Argentine ants do the greatest damage. This species of ants is exceedingly prolific and after gaining access to the upper parts of a tree will do great damage and this is especially true with fruit trees.

It is the object of this invention to provide means whereby a band of poison treated material may be utilized to prevent ants or like insects from crawling up the trunk of a tree or in other words preventing the ants or insects from passing a given point upon a limb or trunk of a tree.

A further object of the invention is to provide means whereby to protect the poison treated band against deterioration.

It is also an object of the invention that the protector be adapted to be applied and retained upon a tree without injury to the tree and without retarding the growth of the tree.

It is also within the scope of the objects of the invention that the protector be of extremely simple construction and inexpensive to manufacture.

Other objects, and objects relating to details of construction, combination and arrangement of parts, will hereinafter appear in the detailed description to follow.

The invention is illustrated by way of example in the accompanying drawings, in which:

Figure 1 is a fragmentary portion of a tree trunk shown in elevation and illustrating the application of the invention, Figure 2 is a transverse sectional view of Figure 1 taken substantially on the line 2—2 and looking in the direction of the arrow, Figure 3 is a fragmentary vertical sectional view of a tree trunk and showing the invention applied, Figure 4 is a detail sectional view particularly illustrating the arrangement of the cotton packing or wadding employed, Figure 5 is a detail view showing a modified form of wrapping which may be employed.

Referring to the drawings more particularly, 10 indicates a band of packing material which is arranged to encircle a tree trunk 11. The band 10 is preferably of raw cotton wadding for the reason that this particular material will enter the crevices in the bark upon the tree and thus form a tight packing about the tree and prevent insects or ants from passing beneath the same. About the band or strip of packing 10 there is wrapped a plurality of layers or plies 12 of brown paper or similar material. These different layers are held in position by one or more convolutions or strands of cord 13, and this cord is preferably positioned as illustrated in Figure 3. The different layers or plies of paper 12 each has its upper portion provided with a plurality of slits, whereby to provide the flaps 14. The slits in each of the different layers of paper are so arranged that the different flaps 14 when bent downwardly as illustrated will overlap each other and provide a canopy or in other words an umbrella formation, generally indicated by the reference numeral 15, and best illustrated in Figure 1 of the drawing.

About the outermost layer of paper 13 there is positioned a band 16 of absorbent material, preferably flannelette, and this band of material is arranged so that the rough side thereof is exposed. The strip of flannelette may have its ends secured together in any convenient manner, as indicated at 16', in Figure 1. This strip of flannelette should be treated or impregnated with a substance highly poisonous to ants or other insects injurious to trees of this character. The band or strip 16' may be treated or impregnated with a poisonous substance either before or after the same is applied.

It is believed from the foregoing that the manner in which my invention can be applied to trees may be clearly understood without further detailed explanation. It is important to note that by providing a band of packing material 10 of the character described that every possibility of insects passing between this band and the tree trunk is eliminated. Furthermore, by providing the canopy 15 the strip 16 which carries the poison is protected and its useful life materially increased. It has been found in actual experiment that this form of protector will last substantially one year, and during this period prevent ants or other insects from passing thereover.

Referring to Figure 5 of the drawings, there is shown a form of wrapping which may be substituted for the layers of paper 12, and this wrapping comprises a pair of strips 17 which are preferably made of glazed paper and similar portions thereof glued or pasted together as illustrated. The remaining portions of the strips 17 are provided with slits 18, said slits extending transversely thereof and arranged in staggered relation. The two strips may be placed about a tree trunk or the limb of a tree and secured by a cord or other suitable means and then the flaps 19 formed by the slits 18 bent downwardly to form a canopy, similar to the canopy 15 shown in Figure 1. This form of canopy will efficiently protect the poison band therebeneath and will also be less bulky than the canopy 15.

I claim:

1. In a protector of the character described, a pair of strips made of flexible sheeting and impervious to water, said strips being adapted to encircle a limb or trunk of a tree, means whereby the strips may be secured to the limb or trunk of a tree, said strips each having its upper portion provided with a plurality of transversely extending slits, whereby to provide flaps, said flaps occurring in staggered relation and adapted to be bent downwardly to form a canopy, for the purpose described.

2. In a tree protector, a plurality of strips of sheeting arranged one upon the other with similar longitudinal edge portions secured to each other, and having the remaining longitudinal edge portions slit transversely.

3. In a tree protector, a plurality of strips of sheeting arranged one upon the other with similar longitudinal edge portions secured to each other, and having the remaining longitudinal edge portions arranged in overlapping relation and slit transversely.

4. In a tree protector, a plurality of strips of sheeting arranged one upon the other with similar longitudinal edge portions secured to each other, and having the remaining longitudinal edge portions slit transversely, said slits occurring in staggered relation.

JACINTHO FERNANDES, Junior.